United States Patent

[11] 3,629,494

[72] Inventor Robert Norman Hurst
Cherry Hill, N.J.

[21] Appl. No. 850,907
[22] Filed Aug. 18, 1969
[45] Patented Dec. 21, 1971
[73] Assignee RCA Corporation

[54] SIGNAL PROCESSOR FOR DROPOUT CORRECTION BEFORE DEMODULATION
6 Claims, 1 Drawing Fig.

[52] U.S. Cl. 178/6.6 DC, 178/6.6 A, 179/100.2 T
[51] Int. Cl. H04n 5/21, H04n 5/78
[50] Field of Search 178/6.6 A, 6.6 DC; 325/476, 347, 6.6 A; 179/100.2 T

[56] References Cited
FOREIGN PATENTS
931,525 7/1963 Great Britain 178/6.6 DC

*Primary Examiner*—Bernard Konick
*Assistant Examiner*—Steven B. Pokotilow
*Attorney*—Edward J. Norton

ABSTRACT: There is provided a circuit for compensating for defective or missing portions of an angle modulation information signal. The angle modulation signal is simultaneously applied directly and through an attenuating delay means to a limiter. The limiting level of the limiter is such as to provide a saturated output in response to the attenuated signal from the delay means. In this manner a missing portion of the information signal directly applied to the limiter is automatically compensated by a previous portion of the information signal from the delay means.

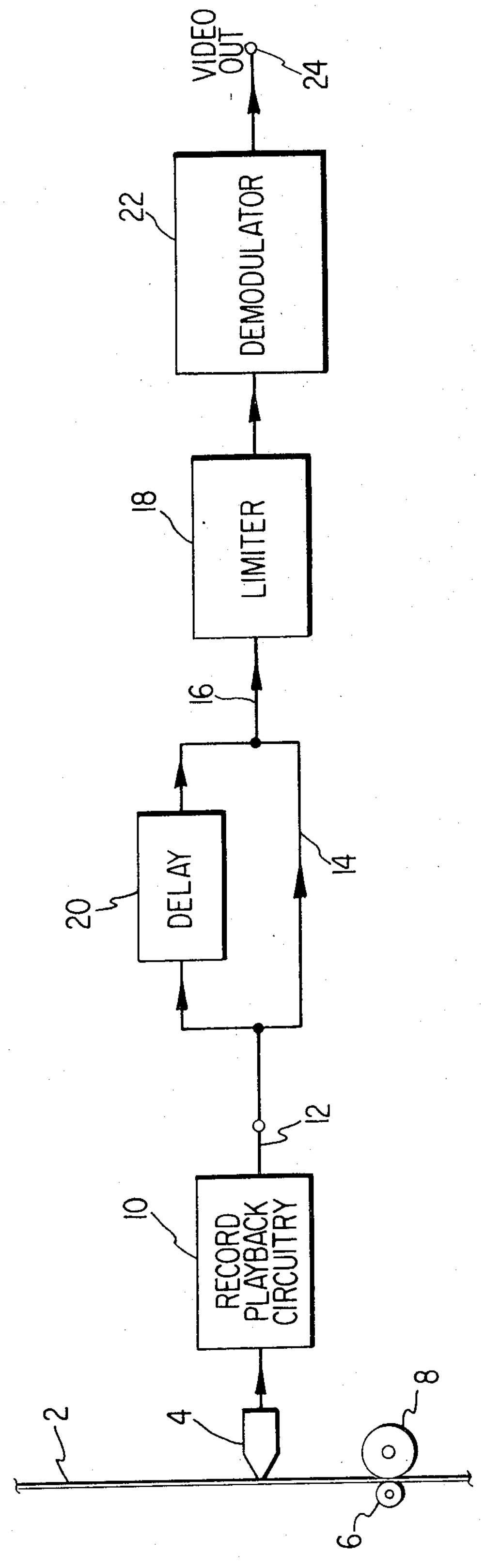
INVENTOR.
Robert N. Hurst
BY James B. Hayes
ATTORNEY

SIGNAL PROCESSOR FOR DROPOUT CORRECTION BEFORE DEMODULATION

The present invention relates to circuits providing compensation for defective or missing portions of an information signal. The invention although not limited thereto, has particular utility in recorder-reproducer systems for compensation of dropouts in a video signal reproduced from a recording medium.

A well-known problem in recording and reproducing television signals on magnetic tape is the occurrence of dropouts or absence of reproduced signal during video playback. These dropouts or signal flaws may for example be due to defects in the tape, accumulated foreign material on the tape or malfunctions in the recording or playback apparatus.

Present approaches to dropout compensation in video tape recorders require the provision of additional and complex equipment, which increase system cost and complexity and tend to decrease system reliability. These approaches find it necessary to include circuitry for sensing the loss of the RF signal from the tape. An electronic video switch is actuated by the sensing circuitry to switch the playback signal between a direct feed and a feed from a video signal storage device.

With the arrangement of the present invention, the necessity of providing signal loss detection and electronic switching functions, with their attendant circuitry, is eliminated. This greatly simplifies and reduces the expense required in providing dropout compensation capability in a recorder-reproducer system. Therefore, the arrangement is especially attractive for utilization in nonbroadcast type recorder systems, where it is desirable to provide many of the operating features of the more expensive broadcast recorders at a minimum cost to the user.

In summary, a signal limiter having an input and an output and exhibiting a given limiting level is provided. Means are provided for directly applying an angle modulation information signal to the input of the limiter. The information signal is also applied to the input of the limiter through a signal delay means having a given attenuation characteristic. The limiter operates to compensate for dropouts in the form of signal absences in the information signal.

The sole FIG. of the drawing is a block diagram illustrating one embodiment of the present invention.

If reference is made to the drawing there is shown a recording medium 2 upon which an information signal, such as a video signal, has been recorded using angle modulation techniques. For present purposes angle modulation is meant to include all forms of frequency and phase modulation.

The structure required to reproduce the recorded information signal is shown in a greatly simplified manner in the drawing. The details of such structure are similar to those of equipment now used in the art and for reasons of simplicity and clarity, are not presented herein.

In the drawing, the medium 2 is moved past a transducer 4 by the action of a capstan 6 and a pinch roller 8. The record medium 2 may be arranged in an endless loop or suitable supply and takeup reels (not shown) may be provided.

The record and playback circuitry 10 is coupled to the transducer 4 and cooperates conjunctively with the medium transport and transducer, to reproduce the angle modulation composite video information signal recorded on the medium 2. Although as noted above, various types of angle modulation may be utilized for the video signal, it is presently most common in the art to use a form of frequency modulation (FM) with some relatively constant envelope level. For purposes of explanation here, it will be assumed a form of frequency modulation is utilized in recording the information on the recording medium 2. The record and playback circuitry 10 may be made to include compensation circuitry and amplifying means, for providing a desired reproduced signal level at the output of the circuitry 10. The output of the record and playback circuitry 10 on lead 12, is coupled via lead 14 directly to the input 16 of limiter circuit 18. The output of circuitry 10 on lead 12 is also coupled through a delay means 20 to the input 16 of the limiter 18. The output of the limiter 18 is coupled through a suitable demodulator 22 to a video output terminal 24.

The signal limiting means 18 may be a conventional type limiter well known in the art and therefore specific embodiments thereof need not be discussed here. The delay means 20 is also conventional and may be one of the known types of delay line or other storage device. Such delay lines characteristically produce an attenuation, for example on the order of 40 db. on the signal passed through them. Generally this attenuation is undesirable. However in the arrangement of the present invention, as will more clearly be understood from the operating description, the delay attenuation is utilized as a desirable operating feature. Therefore the type of delay means utilized should provide an attenuation characteristic which provides an output level appreciably below the level of the signal on lead 14. The demodulator 22 is selected to be a known type which is compatible with the particular form of angle modulation, used in originally recording the information on the recording medium 2.

In the operation of the embodiment shown, the FM signal is reproduced from the medium 2 by the transducer 4 and playback circuitry 10. The FM signal is fed simultaneously directly to the input of the limiter 18, as well as through the delay means 20 to the same input of the limiter 18. While the present embodiment of the invention is shown in block form, it will be understood in the art that the input and output impedances of the circuitry 10, delay means 20 and limiter 18 can be made to have appropriate values to assure substantially all of the signal output of the delay means 20 and the signal on lead 14 is provided to the input of the limiter 18. In the alternative, appropriate isolating or signal combining means, well known in the art, can be provided for the respective signal paths.

For present purposes, the delay of the delay means 20 is assumed to be equivalent to the interval of one horizontal line of the video information signal being reproduced from the medium 2. When a dropout or loss of playback signal occurs, the dropout causes the signal level appearing at the limiter 28 input from lead 24 to drop considerably. The signal from the preceding line of the reproduced video information however, is present though attenuated, for example, 40 db. by the delay means 20. The limiting level of the limiter 18 is made to provide a saturated or fixed output level, in response to the attenuated signal from the delay means 20. The limiting level of the limiter 18 is set below the output level of the delay means 20. The output from the delay means 20 is sufficient to the demodulator 22 input, which will maintain continuity of the demodulated video information, to produce an acceptable picture when the video information is viewed. If required, amplifying means which are included in the playback circuitry 10 or provided separately, may be utilized to produce a level of the reproduced signal which, upon attenuation of the delay means 30, is still sufficient to cause a saturated or fixed amplitude level output from the limiter 18. One horizontal line later in the reproduced video information, the input to the limiter 18 from the delay means 20 output, also is absent as the dropout passes through the delay means 20. However, a complete signal on lead 24 following the period of the dropout now appears at the input to the limiter 18, and there is effectively no loss of video signal out of the demodulator 22, as the dropout is repeated through the delay means 20.

It is noted in the present arrangement, that there is an unwanted spurious signal component present at the limiter 18 input. While it might appear that this would cause unacceptable moire in the video output, the spurious component is some 40 db. down from the desired component. Therefore only a moderately discernible effect is produced, which is highly preferable to a high dropout repetition effect on the video information.

It may be desired to utilize compensating information from an interval other than the preceding horizontal line of the video information. If such compensating information is to be derived, from for example the second or third line preceding a dropout, then the delay interval of the delay means 20 is made to be an integral multiple of the interval of one horizontal line period of the video information signal.

1. A device for providing information continuity from an angle modulation information signal which may have information portions thereof missing, comprising
   a signal limiter having an input and an output and exhibiting a given limiting level;
   signal delay means responsive to said information signal and having a given attenuation characteristic for passing a signal therethrough to provide an attenuated signal output therefrom; and
   means for simultaneously applying said information signal and said output from said delay means to said limiter input.

2. A device for compensating for defective portions of an angle modulation information signal which has at least a given level, comprising:
   signal delay means responsive to said information signal being applied thereto, said delay means providing an output signal therefrom with a level which is less than said given level of said information signal;
   signal-limiting means with an input and an output, said limiting means having a limit level which is less than said output level from said delay means;
   means coupling said output signal of said delay means to said input of said signal-limiting means; and
   means forming a path excluding said delay means for simultaneously applying said information signal to said input of said signal-limiting means.

3. The invention according to claim 2 and further including, demodulation means coupled to the output of said signal-limiting means whereby continuous unmodulated information is provided although portions of said input frequency modulation information signal may be unusable or missing.

4. In a recorder reproducer system having means for reproducing an angle modulation signal from a recording medium, said reproduced signal having periodic information portions normally exhibiting at least a given amplitude, an apparatus for compensating for dropouts in said reproduced signal information, comprising:
   means responsive to a signal applied thereto for delaying said signal for at least an interval of one information period of said reproduced signal, said delay means attenuating said signal to an amplitude below said given amplitude of said reproduced information signal;
   means coupled to said delay means for limiting a signal applied to the input thereof at a level below the output amplitude of said delay means;
   means for providing to said delay means said reproduced information signal with an amplitude sufficient to produce an output amplitude from said delay means which exceeds the limiting level of said limiting means; and
   means for applying said reproduced information signal directly to said input of said limiting means simultaneously with said attenuated signal.

5. The invention according to claim 4 wherein said system is television recorder reproducer system in which video signals represent successive horizontal lines of a picture and wherein said delay means delays said reproduced signal by a time interval constituting one horizontal line of said picture relative to said signal applied directly to said limiting means.

6. The invention according to claim 4 wherein; said delay means delays said reproduced signal by a time interval which comprises an integral multiple of the time interval for one information period of said reproduced signal relative to said signal applied directly to said limiting means.

* * * * *

UNITED STATES PATENT OFFICE
CERTIFICATE OF CORRECTION

Patent No. 3,629,494 Dated December 21, 1971

Inventor(s) Robert Norman Hurst

It is certified that error appears in the above-identified patent and that said Letters Patent are hereby corrected as shown below:

Column 2, line 40 - "24" should read --14--

Colume 2, line 47 - Line left out, insert after "to" --saturate the limiter 18. This provides a limiter 18 output to--

Column 2, line 54 - "30" should read --20--

Column 2, line 59 - "24" should read --14--

Signed and sealed this 15th day of August 1972.

(SEAL)
Attest:

EDWARD M.FLETCHER,JR.
Attesting Officer

ROBERT GOTTSCHALK
Commissioner of Patents